(12) United States Patent
Hsieh et al.

(10) Patent No.: US 8,982,479 B2
(45) Date of Patent: Mar. 17, 2015

(54) WIDE-ANGLE IMAGE CAPTURING LENS ASSEMBLY

(71) Applicant: Largan Precision Co., Ltd., Taichung (TW)

(72) Inventors: Dung-Yi Hsieh, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 145 days.

(21) Appl. No.: 13/792,178

(22) Filed: Mar. 10, 2013

(65) Prior Publication Data

US 2014/0226222 A1   Aug. 14, 2014

(30) Foreign Application Priority Data

Feb. 8, 2013   (TW) .............................. 102105430 A

(51) Int. Cl.
   *G02B 3/02*   (2006.01)
   *G02B 13/18*   (2006.01)
   *G02B 9/34*   (2006.01)
   *G02B 9/58*   (2006.01)
   *G02B 13/00*   (2006.01)
   *G02B 13/04*   (2006.01)

(52) U.S. Cl.
   CPC ... *G02B 9/34* (2013.01); *G02B 9/58* (2013.01); *G02B 13/18* (2013.01); *G02B 13/004* (2013.01); *G02B 13/04* (2013.01)
   USPC .............................. 359/715; 359/781; 359/782

(58) Field of Classification Search
   CPC .......... G02B 9/34; G02B 9/58; G02B 13/004; G02B 13/18
   USPC .................................. 359/708, 715, 781, 782
   See application file for complete search history.

(56) References Cited

U.S. PATENT DOCUMENTS

| | | | |
|---|---|---|---|
| 7,365,920 B2 | 4/2008 | Noda | |
| 7,548,385 B2 * | 6/2009 | Hirano | 359/782 |
| 7,633,690 B2 * | 12/2009 | Yasuhiko | 359/773 |
| 8,014,080 B1 | 9/2011 | Chen et al. | |
| 8,817,387 B2 * | 8/2014 | Kubota et al. | 359/715 |
| 2009/0097137 A1 * | 4/2009 | Cheng et al. | 359/782 |

(Continued)

FOREIGN PATENT DOCUMENTS

| | | |
|---|---|---|
| JP | 2008-58387 A | 3/2008 |
| TW | 201122614 A | 7/2011 |

(Continued)

*Primary Examiner* — Thomas K Pham
*Assistant Examiner* — Nicholas Pasko
(74) *Attorney, Agent, or Firm* — CKC & Partners Co., Ltd.

(57) ABSTRACT

A wide-angle image capturing lens assembly includes four lens elements with refractive power, in order from an object side to an image side, a first lens element, a second lens element, a third lens element and a fourth lens element and each of the first through fourth lens elements is single and non-cemented. The first lens element with negative refractive power has a concave image-side surface. The second lens element with refractive power has a concave object-side surface and a convex image-side surface. The third lens element with positive refractive power has a convex image-side surface. The fourth to lens element with negative refractive power has a concave object-side surface and a convex image-side surface, wherein both of the object-side surface and the image-side surface of the fourth lens element are aspheric.

21 Claims, 12 Drawing Sheets

(56) References Cited

U.S. PATENT DOCUMENTS

| | | |
|---|---|---|
| 2009/0122423 A1 | 5/2009 | Park et al. |
| 2011/0157453 A1* | 6/2011 | Chen et al. ................... 348/340 |
| 2012/0262804 A1* | 10/2012 | Tang et al. ................... 359/717 |
| 2013/0208354 A1* | 8/2013 | Tsai et al. ................... 359/357 |
| 2013/0208365 A1* | 8/2013 | Hsu et al. ................... 359/715 |

FOREIGN PATENT DOCUMENTS

| | | |
|---|---|---|
| TW | 201241501 A | 10/2012 |
| TW | 201305594 A | 2/2013 |

* cited by examiner

WIDE-ANGLE IMAGE CAPTURING LENS ASSEMBLY

RELATED APPLICATIONS

The application claims priority to Taiwan Application Serial Number 102105430, filed on Feb. 8, 2013, which is herein incorporated by reference.

BACKGROUND

1. Technical Field

The present disclosure relates to a wide-angle image capturing lens assembly. More particularly, the present disclosure relates to a compact wide-angle image capturing lens assembly applicable to electronic products.

2. Description of Related Art

In recent years, with the popularity of mobile products having camera functionalities, the demand of miniaturized optical lens systems has been increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure such as the one disclosed in the U.S. Pat. No. 7,365,920. The positive first lens element and the negative second lens element of the four-element lens structure are attached to each other to form a doublet lens. However, during the cementing process, the doublet lens tends to be decentered. Moreover, this doublet lens might be tilted if the glue is not applied evenly. The degrees of freedom of these two cementing surfaces might also be limited. Therefore, the doublet lens is hard to be applied to the electronic products featuring superior image quality since the manufacturing processes of the doublet lens makes it difficult to improve image quality.

There is another conventional optical lens systems with four-element lens structure such as the one disclosed in the U.S. Pat. No. 8,014,080. Although its first lens element with negative refractive power is favorable for enlarging the field of view, it still cannot satisfy the requirement of present automotive optical lens systems. Furthermore, its surface design of the lens elements is not favorable for correcting the aberration; it is thereby not suitable for the present automotive optical lens systems featuring superior image quality.

SUMMARY

According to one aspect of the present disclosure, a wide-angle image capturing lens assembly includes four lens elements with refractive power, in order from an object side to an image side, a first lens element, a second lens element, a third lens element and a fourth lens element. The first lens element with negative refractive power has a concave image-side surface. The second lens element with refractive power has a concave object-side surface and a convex image-side surface. The third lens element with positive refractive power has a convex image-side surface. The fourth lens element with negative refractive power has a concave object-side surface and a convex image-side surface, wherein both of the object-side surface and the image-side surface of the fourth lens element are aspheric. Each of the first through fourth lens elements is a single and non-cemented lens element with refractive power. When a curvature radius of an object-side surface of the third lens element is R5, a curvature radius of the image-side surface of the third lens element is R6, and a curvature radius of the object-side surface of the fourth lens element is R7, the following relationships are satisfied:

$$0.6 < (R5+R6)/(R5-R6) < 2.0; \text{ and}$$

$$0.30 < R7/R6 < 0.74.$$

According to another aspect of the present disclosure, a wide-angle image capturing lens assembly includes four lens elements with refractive power, in order from an object side to an image side, a first lens element, a second lens element, a third lens element and a fourth lens element. The first lens element with negative refractive power has a concave image-side surface. The second lens element with refractive power has a convex image-side surface. The third lens element with positive refractive power has a convex image-side surface. The fourth lens element with negative refractive power has a concave object-side surface and a convex image-side surface, wherein both of the object-side surface and the image-side surface of the fourth lens element are aspheric. Each of the first through fourth lens elements is a single and non-cemented lens element with refractive power. When a curvature radius of an object-side surface of the third lens element is R5, a curvature radius of the image-side surface of the third lens element is R6, a curvature radius of the object-side surface of the fourth lens element is R7, an axial distance between the first lens element and the second lens element is T12, and a focal length of the wide-angle image capturing lens assembly is f, the following relationships are satisfied:

$$0.6 < (R5+R6)/(R5-R6) < 2.0;$$

$$0.30 < R7/R6 < 0.90; \text{ and}$$

$$0.80 < T12/f < 2.5.$$

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
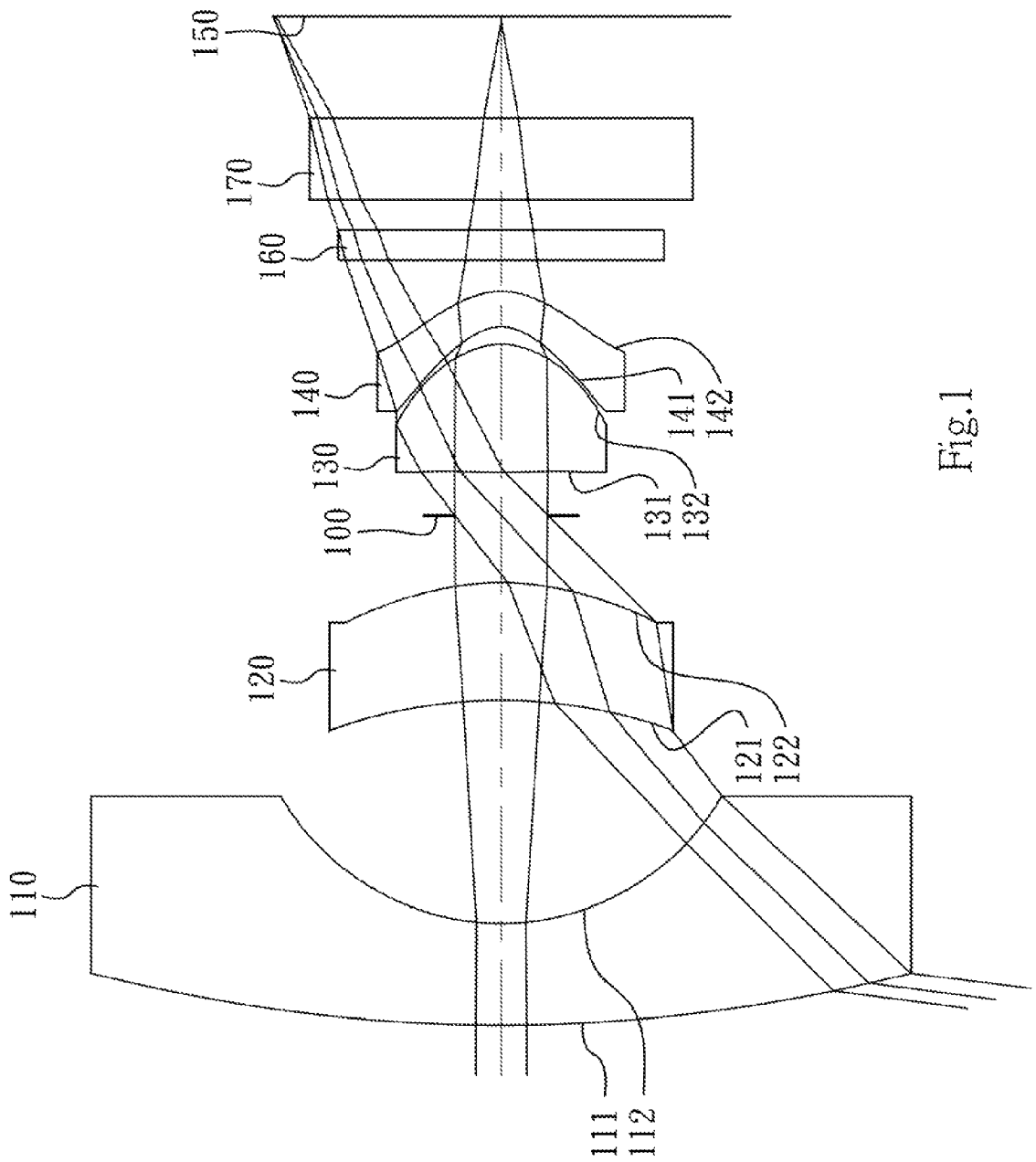
FIG. 1 is a schematic view of a wide-angle image capturing lens assembly according to the 1st embodiment of the present disclosure.

A wide-angle image capturing lens assembly includes four lens elements with refractive power, in order from an object side to an image side, a first lens element, a second lens element, a third lens element and a fourth lens element. Each of the first through fourth lens elements is a single and non-cemented lens element with refractive power. That is, any two lens elements adjacent to each other are not cemented, and there is an air space between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to decentration and it is thereby not favorable for achieving better image quality of the wide-angle image capturing lens assembly. Therefore, the wide-angle image capturing lens assembly of the present disclosure provides four non-cemented lens elements for improving the problem generated by the cemented lens elements.

The first lens element with negative refractive power can have a convex object-side surface and has a concave image-side surface, so that the field of view of the wide-angle image capturing lens assembly can be enlarged.

The second lens element with positive refractive power can have a concave object-side surface and has a convex image-side surface. Therefore, it is favorable for providing the wide-angle image capturing lens assembly with the positive refractive power as it needs to be and correcting the astigmatism.

The third lens element with positive refractive power has a convex image-side surface. Therefore, it is favorable for reducing the sensitivity and the spherical aberration of the wide-angle image capturing lens assembly.

The fourth lens element with negative refractive power has a concave object-side surface and a convex image-side surface. Therefore, it is favorable for balancing the arrangement of the negative refractive power and correcting the astigmatism of the wide-angle image capturing lens assembly.

When a curvature radius of an object-side surface of the third lens element is R5, and a curvature radius of the image-side surface of the third lens element is R6, the following relationship is satisfied: $0.6<(R5+R6)/(R5-R6)<2.0$. Therefore, it is favorable for reducing the spherical aberration and correcting the astigmatism. Preferably, the following relationship is satisfied: $0.8<(R5+R6)/(R5-R6)<1.5$. More preferably, the following relationship is satisfied: $0.85<(R5+R6)/(R5-R6)<1.3$.

When the curvature radius of the image-side surface of the third lens element is R6, and a curvature radius of the object-side surface of the fourth lens element is R7, the following relationship is satisfied: $0.30<R7/R6<0.90$. Therefore, it is favorable for correcting the aberration so as to improve image quality. Preferably, the following relationship is satisfied: $0.30<R7/R6<0.74$.

The wide-angle image capturing lens assembly can further comprise a stop, such as an aperture stop, which locates between the second lens element and the third lens element. Therefore, it is favorable for enlarging the field of view of the wide-angle image capturing lens assembly and thereby provides a wider field of view for the same.

When an axial distance between the first lens element and the second lens element is T12, and a focal length of the wide-angle image capturing lens assembly is f, the following relationship is satisfied: $0.80<T12/f<2.5$. Therefore, it is favorable for assembling the lens elements and maintaining a proper total track length of the wide-angle image capturing lens assembly. Preferably, the following relationship is satisfied: $1.2<T12/f<2.0$.

When the focal length of the wide-angle image capturing lens assembly is f, and a focal length of the third lens element is f3, the following relationship is satisfied: $0.9<f/f3<1.7$. Therefore, it is favorable for reducing the sensitivity of the wide-angle image capturing lens assembly.

When the focal length of the wide-angle image capturing lens assembly is f, and a focal length of the second lens element is f2, the following relationship is satisfied: $|f/f2|<0.40$. Therefore, it is favorable for reducing the aberration and correcting the distortion by compensating with the first lens element.

When an Abbe number of the second lens element is V2, an Abbe number of the third lens element is V3, and an Abbe number of the fourth lens element is V4, the following relationship is satisfied: $0.7<(V2+V4)/V3<1.2$. Therefore, it is favorable for correcting the chromatic aberration of the wide-angle image capturing lens assembly.

When a maximal field of view of the wide-angle image capturing lens assembly is FOV, the following relationship is satisfied: 120 degrees<FOV<200 degrees. Therefore, the wide-angle image capturing lens assembly can have a larger field of view for increasing image capturing range.

When the curvature radius of the object-side surface of the fourth lens element is R7, and a curvature radius of the image-side surface of the fourth lens element is R8, the following relationship is satisfied: $-0.50<(R7-R8)/(R7+R8)<-0.10$. Therefore, it is favorable for correcting the astigmatism. Preferably, the following relationship is satisfied: $-0.40<(R7-R8)/(R7+R8)<-0.20$.

When the focal length of the third lens element is f3, and a focal length of the fourth lens element is f4, the following relationship is satisfied: $-0.6<f3/f4<-0.3$. Therefore, it is favorable for balancing the arrangement of the refractive power of the wide-angle image capturing lens assembly and reducing the sensitivity thereof.

When a composite focal length of the lens elements with refractive power disposed between an object and the stop is ffs, and a composite focal length of the lens elements with refractive power disposed between the stop and an image plane is frs, the following relationship is satisfied: $0<frs/ffs<0.25$. Therefore, it is favorable for balancing the refractive power of the lens elements configured on the object side and the image side of the stop so as to enlarge the field of view of the wide-angle image capturing lens assembly and thereby provides a wider field of view for the same. The refractive power of the lens elements configured on the object side of the stop as mentioned above refers to the refractive power of the lens elements disposed between the object and the stop. The refractive power of the lens elements configured on the image side of the stop as mentioned above refers to the refractive power of the lens elements disposed between the stop and the image plane.

When an axial distance between the third lens element and the fourth lens element is T34, and the focal length of the wide-angle image capturing lens assembly is f, the following relationship is satisfied: 0.05<T34/f<0.20. Therefore, it is favorable for assembling the lens elements so as to increase the manufacturing yield rate of the wide-angle image capturing lens assembly.

When the composite focal length of the lens elements with refractive power disposed between the object and the stop is ffs, and the focal length of the wide-angle image capturing lens assembly is f, the following relationship is satisfied: 0<f/ffs. Therefore, the total track length will not be too long through a proper arrangement of the refractive power of the lens elements configured on the object side of the stop.

According to the wide-angle image capturing lens assembly of the present disclosure, the lens elements thereof can be made of glass or plastic material. When the lens elements are made of glass material, the distribution of the refractive power of the wide-angle image capturing lens assembly may be more flexible to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the wide-angle image capturing lens assembly can also be reduced.

According to the wide-angle image capturing lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region; and when the lens element has a concave surface, it indicates that the surface is concave at the paraxial region.

According to the wide-angle image capturing lens assembly of the present disclosure, the wide-angle image capturing lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between the object and the first lens element provides a longer distance from an exit pupil of the system to the image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the wide-angle image capturing lens assembly of the present disclosure, the wide-angle image capturing lens assembly is featured with good correction ability and high image quality, and can be applied to 3D (three-dimensional) image capturing applications, in products such as digital cameras, mobile devices and tablets.

According to the above description of the present disclosure, the following 1st-6th specific embodiments are provided for further explanation.

1st Embodiment

Figure 2:
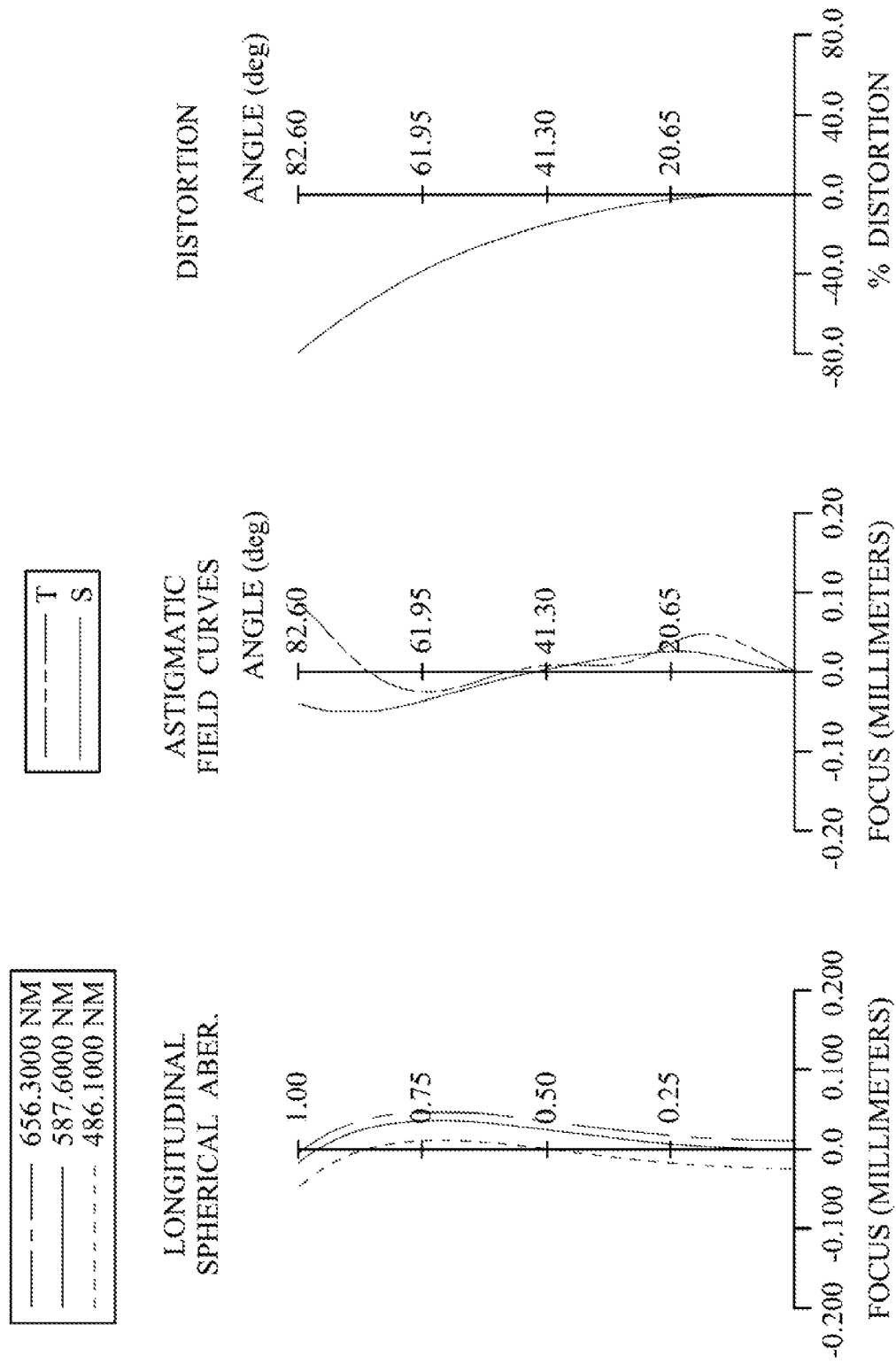
FIG. 2 shows spherical aberration curves, astigmatic field curves and a distortion curve of the wide-angle image capturing lens assembly according to the 1st embodiment.

FIG. 1 is a schematic view of a wide-angle image capturing lens assembly according to the 1st embodiment of the present disclosure. FIG. 2 shows spherical aberration curves, astigmatic field curves and a distortion curve of the wide-angle image capturing lens assembly according to the 1st embodiment. In FIG. 1, the wide-angle image capturing lens assembly includes four lens elements with refractive power, in order from an object side to an image side, a first lens element 110, a second lens element 120, an aperture stop 100, a third lens element 130, a fourth lens element 140, an IR-cut filter 160, a cover glass 170 and an image plane 150.

The first lens element 110 with negative refractive power has a convex object-side surface 111 and a concave image-side surface 112. The first lens element 110 is made of glass material.

The second lens element 120 with positive refractive power has a concave object-side surface 121 and a convex image-side surface 122. The second lens element 120 is made of plastic material and has the object-side surface 121 and the image-side surface 122 being both aspheric.

The third lens element 130 with positive refractive power has a convex object-side surface 131 and a convex image-side surface 132. The third lens element 130 is made of plastic material and has the object-side surface 131 and the image-side surface 132 being both aspheric.

The fourth lens element 140 with negative refractive power has a concave object-side surface 141 and a convex image-side surface 142. The fourth lens element 140 is made of plastic material and has the object-side surface 141 and the image-side surface 142 being both aspheric.

Each of the first through fourth lens elements (110-140) is a single and non-cemented lens element with refractive power. The IR-cut filter 160 and the cover glass 170 are made of glass materials which are in order located between the fourth lens element 140 and the image plane 150, and will not affect a focal length of the wide-angle image capturing lens assembly.

The equation of the aspheric surface profiles of the aforementioned lens elements of the wide-angle image capturing lens assembly is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the wide-angle image capturing lens assembly according to the 1st embodiment, when the focal length of the wide-angle image capturing lens assembly is f, an f-number of the wide-angle image capturing lens assembly is Fno, and half of a maximal field of view of the wide-angle image capturing lens assembly is HFOV, these parameters have the following values: f=1.42 mm; Fno=2.84; and HFOV=82.6 degrees.

In the wide-angle image capturing lens assembly according to the 1st embodiment, when an Abbe number of the second lens element 120 is V2, an Abbe number of the third lens element 130 is V3, and an Abbe number of the fourth lens element 140 is V4, the following relationship is satisfied: (V2+V4)/V3=0.83.

In the wide-angle image capturing lens assembly according to the 1st embodiment, when an axial distance between the first lens element 110 and the second lens element 120 is T12, an axial distance between the third lens element 130 and the fourth lens element 140 is T34, and the focal length of the wide-angle image capturing lens assembly is f, the following relationships are satisfied: T12/f=1.54; and T34/f=0.12.

In the wide-angle image capturing lens assembly according to the 1st embodiment, when a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following relationships are satisfied: R7/R6=0.62; (R5+R6)/(R5−R6)=0.88; and (R7−R8)/(R7+R8)=−0.27.

In the wide-angle image capturing lens assembly according to the 1st embodiment, when the focal length of the wide-angle image capturing lens assembly is f, a focal length of the second lens element 120 is f2, a focal length of the third lens element 130 is f3, and a focal length of the fourth lens element 140 is f4, the following relationships are satisfied: |f/f2|=0.20; f/f3=1.20; and f3/f4=−0.43.

In the wide-angle image capturing lens assembly according to the 1st embodiment, when the focal length of the wide-angle image capturing lens assembly is f, a composite focal length of the lens elements with refractive power disposed between an object and the stop 100 is ffs, and a composite focal length of the lens elements with refractive power disposed between the stop 100 and the image plane 150 is frs, the following relationships are satisfied: f/ffs=0.01; and frs/ffs=0.03.

In the wide-angle image capturing lens assembly according to the 1st embodiment, when the maximal field of view of the wide-angle image capturing lens assembly is FOV, the following relationship is satisfied: FOV=165.2 degrees.

The detailed optical data of the 1st embodiment are shown in Table 1 and the aspheric surface data are shown in Table 2 below.

TABLE 1

1st Embodiment
f = 1.42 mm, Fno = 2.84, HFOV = 82.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 16.215 | 1.000 | Glass | 1.729 | 54.5 | −4.18 |
| 2 | | 2.500 | 2.190 | | | | |
| 3 | Lens 2 | −4.580 ASP | 1.159 | Plastic | 1.640 | 23.3 | 7.25 |
| 4 | | −2.533 ASP | 0.664 | | | | |
| 5 | Ape. Stop | Plano | 0.421 | | | | |
| 6 | Lens 3 | 10.165 ASP | 1.265 | Plastic | 1.544 | 55.9 | 1.19 |
| 7 | | −0.661 ASP | 0.170 | | | | |
| 8 | Lens 4 | −0.409 ASP | 0.350 | Plastic | 1.640 | 23.3 | −2.78 |
| 9 | | −0.708 ASP | 0.300 | | | | |

TABLE 1-continued

1st Embodiment
f = 1.42 mm, Fno = 2.84, HFOV = 82.6 deg.

| Surface # | | Curvature Radius | Thickness | Material | Index | Abbe # | Focal Length |
|---|---|---|---|---|---|---|---|
| 10 | IR-cut filter | Plano | 0.300 | Glass | 1.517 | 64.2 | — |
| 11 | | Plano | 0.300 | | | | |
| 12 | Cover glass | Plano | 0.800 | Glass | 1.517 | 64.2 | — |
| 13 | | Plano | 1.005 | | | | |
| 14 | Image | Plano | — | | | | |

Note:
Reference wavelength (d-line) is 587.6 nm.

TABLE 2

Aspheric Coefficients

| | Surface # | | |
|---|---|---|---|
| | 3 | 4 | 6 |
| k = | 3.5691E+00 | −8.8090E+00 | −1.0000E+00 |
| A4 = | 1.7495E−02 | −1.7980E−02 | −3.4380E−02 |
| A6 = | −4.0283E−03 | 1.2812E−03 | −5.8189E−02 |
| A8 = | 4.8859E−04 | 2.0468E−04 | 8.7163E−02 |
| A10 = | 1.7863E−05 | −7.2716E−05 | −1.6733E−01 |

| | Surface # | | |
|---|---|---|---|
| | 7 | 8 | 9 |
| k = | −1.4171E+00 | −1.9010E+00 | −2.9655E+00 |
| A4 = | 2.3023E−01 | −2.4873E−01 | −2.0204E−01 |
| A6 = | −7.4793E−01 | 1.2700E−01 | 2.3778E−01 |
| A8 = | 6.4012E−01 | −2.7495E−02 | −1.1258E−01 |
| A10 = | −2.2439E−01 | 4.0972E−02 | 2.7122E−02 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
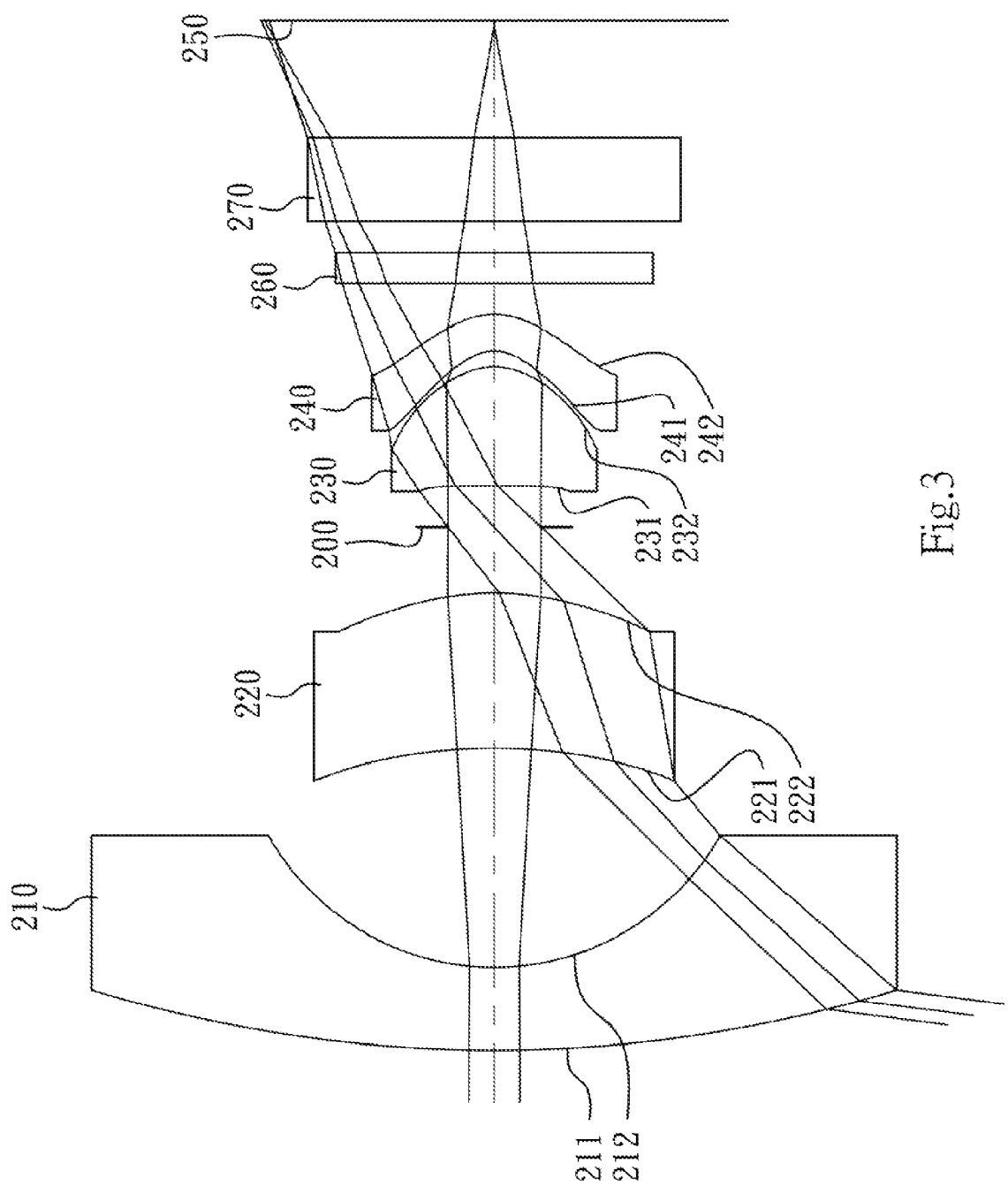
FIG. 3 is a schematic view of a wide-angle image capturing lens assembly according to the 2nd embodiment of the present disclosure.
Figure 4:
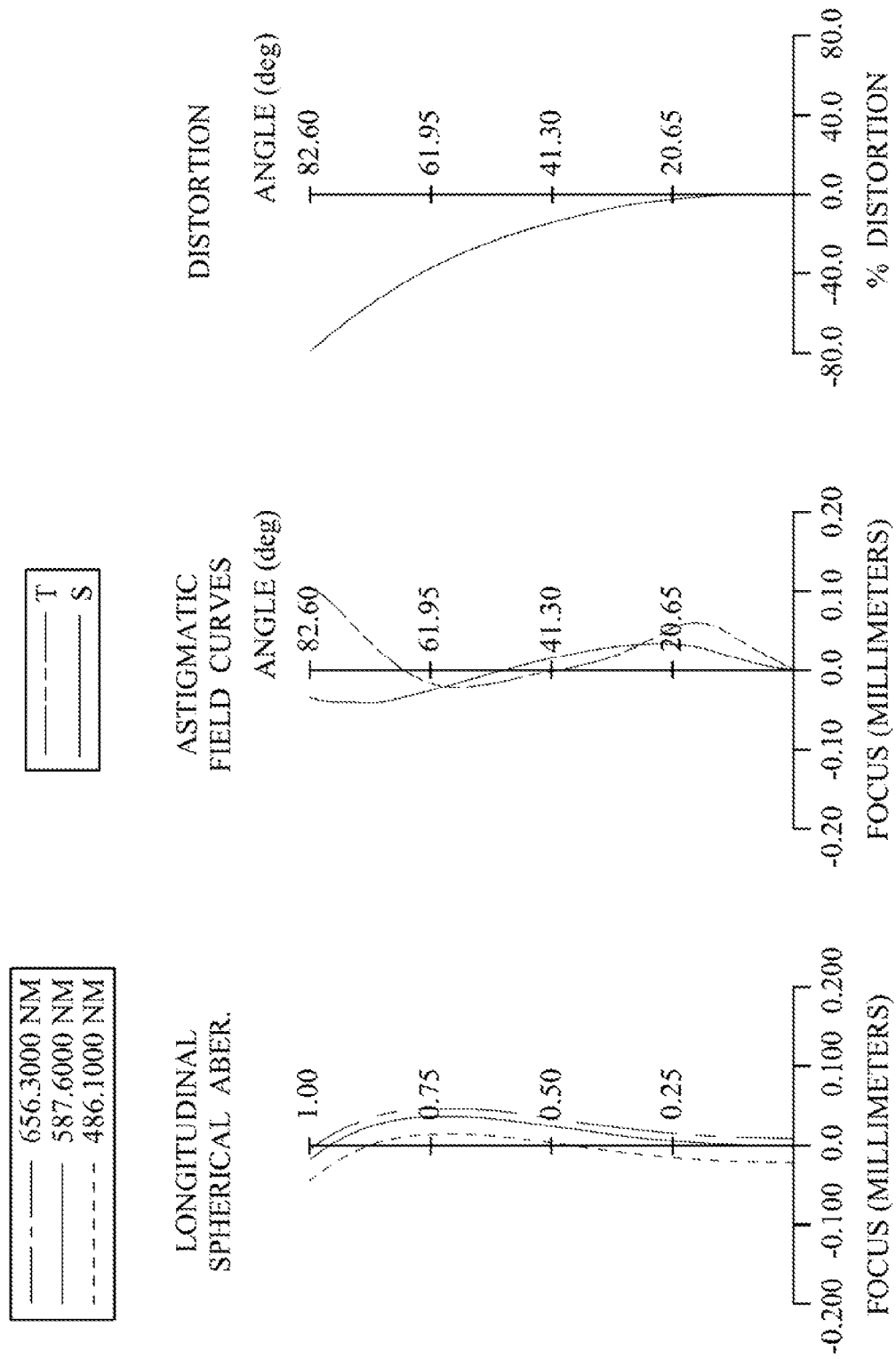
FIG. 4 shows spherical aberration curves, astigmatic field curves and a distortion curve of the wide-angle image capturing lens assembly according to the 2nd embodiment.

FIG. 3 is a schematic view of a wide-angle image capturing lens assembly according to the 2nd embodiment of the present disclosure. FIG. 4 shows spherical aberration curves, astigmatic field curves and a distortion curve of the wide-angle image capturing lens assembly according to the 2nd embodiment. In FIG. 3, the wide-angle image capturing lens assembly includes, in order from an object side to an image side, a first lens element 210, a second lens element 220, an aperture stop 200, a third lens element 230, a fourth lens element 240, an IR-cut filter 260, a cover glass 270 and an image plane 250.

The first lens element 210 with negative refractive power has a convex object-side surface 211 and a concave image-side surface 212. The first lens element 210 is made of glass material.

The second lens element 220 with positive refractive power has a concave object-side surface 221 and a convex image-side surface 222. The second lens element 220 is made of plastic material and has the object-side surface 221 and the image-side surface 222 being both aspheric.

The third lens element 230 with positive refractive power has a concave object-side surface 231 and a convex image-side surface 232. The third lens element 230 is made of plastic material and has the object-side surface 231 and the image-side surface 232 being both aspheric.

The fourth lens element 240 with negative refractive power has a concave object-side surface 241 and a convex image-side surface 242. The fourth lens element 240 is made of plastic material and has the object-side surface 241 and the image-side surface 242 being both aspheric.

Each of the first through fourth lens elements (210-240) is a single and non-cemented lens element with refractive power. The IR-cut filter 260 and the cover glass 270 are made of glass materials which are in order located between the fourth lens element 240 and the image plane 250, and will not affect a focal length of the wide-angle image capturing lens assembly.

The detailed optical data of the 2nd embodiment are shown in Table 3 and the aspheric surface data are shown in Table 4 below.

TABLE 3

2nd Embodiment
f = 1.39 mm, Fno = 2.84, HFOV = 82.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.251 | | 0.800 | Glass | 1.729 | 54.5 | -4.36 |
| 2 | | 2.500 | | 2.110 | | | | |
| 3 | Lens 2 | -4.895 | ASP | 1.500 | Plastic | 1.640 | 23.3 | 7.01 |
| 4 | | -2.620 | ASP | 0.632 | | | | |
| 5 | Ape. Stop | Plano | | 0.399 | | | | |
| 6 | Lens 3 | -100.000 | ASP | 1.152 | Plastic | 1.544 | 55.9 | 1.10 |
| 7 | | -0.600 | ASP | 0.149 | | | | |
| 8 | Lens 4 | -0.387 | ASP | 0.350 | Plastic | 1.640 | 23.3 | -2.57 |
| 9 | | -0.684 | ASP | 0.300 | | | | |
| 10 | IR-cut filter | Plano | | 0.300 | Glass | 1.517 | 64.2 | — |
| 11 | | Plano | | 0.300 | | | | |
| 12 | Cover glass | Plano | | 0.800 | Glass | 1.517 | 64.2 | — |
| 13 | | Plano | | 1.131 | | | | |
| 14 | Image | Plano | | — | | | | |

Note:
Reference wavelength (d-line) is 587.6 nm.

TABLE 4

Aspheric Coefficients

| | Surface # | | |
|---|---|---|---|
| | 3 | 4 | 6 |
| k = | 3.3693E+00 | -9.5515E+00 | -1.0000E+00 |
| A4 = | 1.7057E-02 | -2.5388E-02 | -5.2829E-02 |
| A6 = | -8.5736E-03 | 5.1797E-03 | -1.9298E-01 |
| A8 = | 3.0941E-03 | -8.1823E-04 | 3.4136E-01 |
| A10 = | -7.0590E-04 | 2.6398E-05 | -7.5057E-01 |
| A12 = | 7.2629E-05 | 1.0318E-05 | — |

TABLE 4-continued

Aspheric Coefficients

| | Surface # | | |
|---|---|---|---|
| | 7 | 8 | 9 |
| k = | -1.7738E+00 | -1.8790E+00 | -2.7744E+00 |
| A4 = | 1.3240E-01 | -2.2375E-01 | -1.8772E-01 |
| A6 = | -7.6413E-01 | 4.9736E-01 | 2.9466E-01 |
| A8 = | 6.8945E-01 | -1.5702E+00 | -2.7031E-01 |
| A10 = | -2.8401E-01 | 2.9623E+00 | 1.8831E-01 |
| A12 = | — | -3.1916E+00 | -7.8882E-02 |
| A14 = | — | 2.0415E+00 | 1.8350E-02 |
| A16 = | — | -5.6589E-01 | -1.0182E-03 |

In the wide-angle image capturing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f [mm] | 1.39 | (R7 - R8)/(R7 + R8) | -0.28 |
|---|---|---|---|
| Fno | 2.84 | |f/f2| | 0.20 |
| HFOV [deg.] | 82.6 | f/f3 | 1.26 |
| (V2 + V4)/V3 | 0.83 | f3/f4 | -0.43 |
| T12/f | 1.52 | f/ffs | 0.04 |
| T34/f | 0.11 | frs/ffs | 0.08 |
| R7/R6 | 0.64 | FOV [deg.] | 165.2 |
| (R5 + R6)/(R5 - R6) | 1.01 | | |

3rd Embodiment

Figure 5:
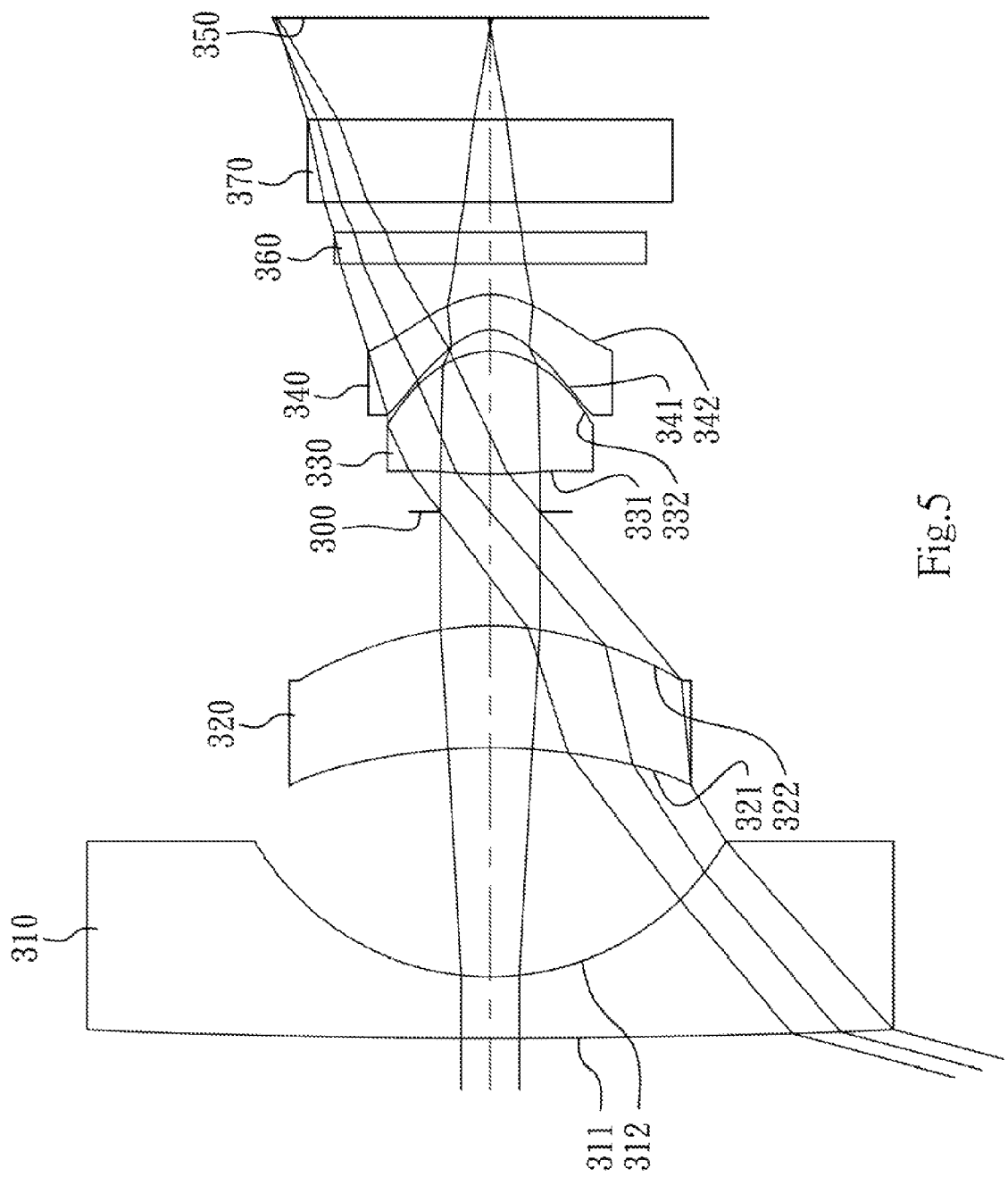
FIG. 5 is a schematic view of a wide-angle image capturing lens assembly according to the 3rd embodiment of the present disclosure.
Figure 6:
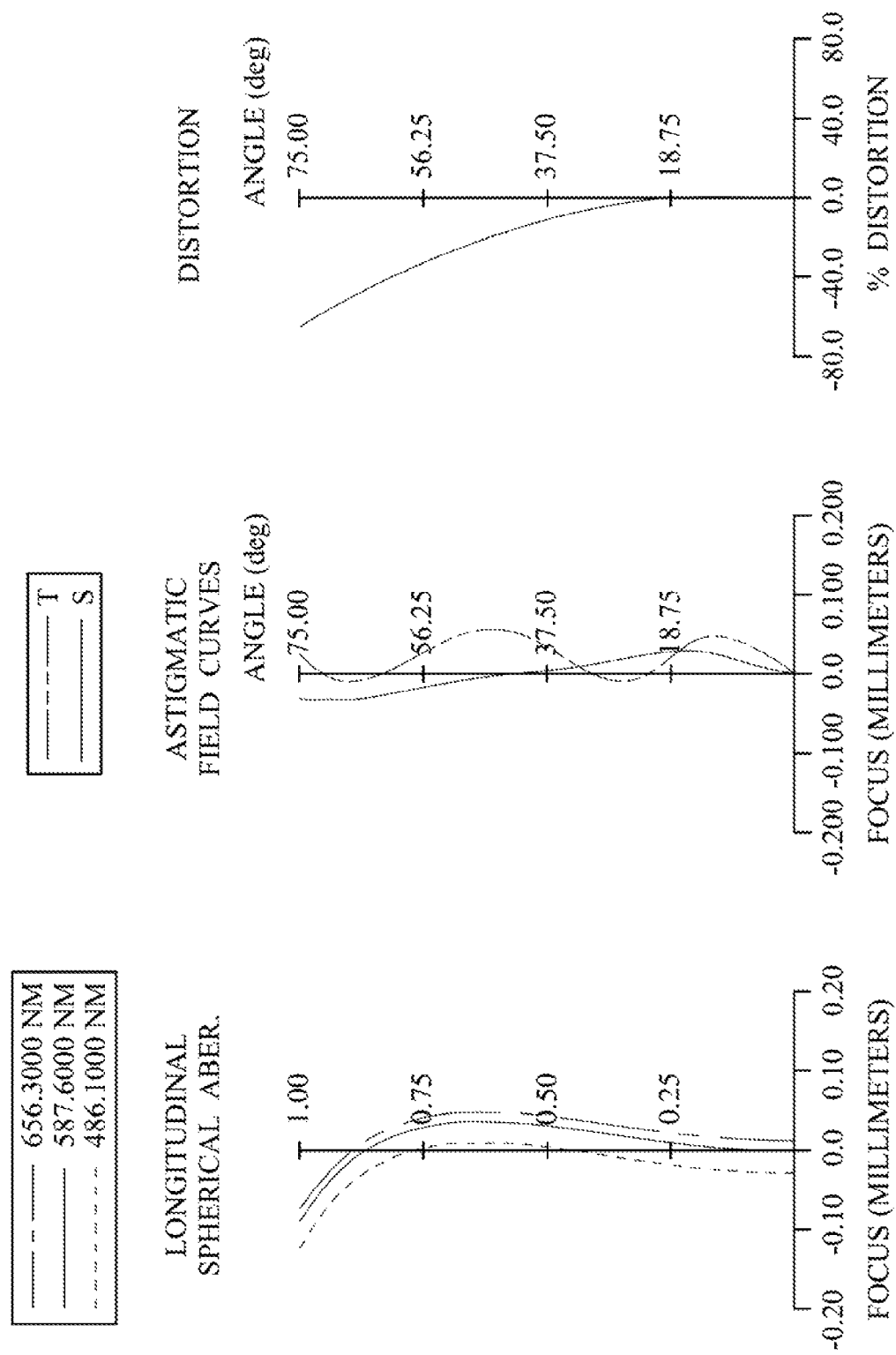
FIG. 6 shows spherical aberration curves, astigmatic field curves and a distortion curve of the wide-angle image capturing lens assembly according to the 3rd embodiment.

FIG. 5 is a schematic view of a wide-angle image capturing lens assembly according to the 3rd embodiment of the present disclosure. FIG. 6 shows spherical aberration curves, astigmatic field curves and a distortion curve of the wide-angle image capturing lens assembly according to the 3rd embodiment. In FIG. 5, the wide-angle image capturing lens assembly includes, in order from an object side to an image side, a first lens element 310, a second lens element 320, an aperture stop 300, a third lens element 330, a fourth lens element 340, an IR-cut filter 360, a cover glass 370 and an image plane 350.

The first lens element 310 with negative refractive power has a convex object-side surface 311 and a concave image-side surface 312. The first lens element 310 is made of plastic material and has the object-side surface 311 and the image-side surface 312 being both aspheric.

The second lens element 320 with positive refractive power has a concave object-side surface 321 and a convex image-side surface 322. The second lens element 320 is made of plastic material and has the object-side surface 321 and the image-side surface 322 being both aspheric.

The third lens element 330 with positive refractive power has a convex object-side surface 331 and a convex image-side surface 332. The third lens element 330 is made of plastic material and has the object-side surface 331 and the image-side surface 332 being both aspheric.

The fourth lens element 340 with negative refractive power has a concave object-side surface 341 and a convex image-side surface 342. The fourth lens element 340 is made of plastic material and has the object-side surface 341 and the image-side surface 342 being both aspheric.

Each of the first through fourth lens elements (310-340) is a single and non-cemented lens element with refractive power. The IR-cut filter 360 and the cover glass 370 are made of glass materials which are in order located between the fourth lens element 340 and the image plane 350, and will not affect a focal length of the wide-angle image capturing lens assembly.

The detailed optical data of the 3rd embodiment are shown in Table 5 and the aspheric surface data are shown in Table 6 below.

TABLE 5

3rd Embodiment
f = 1.61 mm, Fno = 2.84, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 69.003 | ASP | 0.600 | Plastic | 1.544 | 55.9 | −4.98 |
| 2 | | 2.600 | ASP | 2.220 | | | | |
| 3 | Lens 2 | −5.232 | ASP | 1.188 | Plastic | 1.640 | 23.3 | 7.77 |
| 4 | | −2.776 | ASP | 1.103 | | | | |
| 5 | Ape. Stop | Plano | | 0.369 | | | | |
| 6 | Lens 3 | 5.277 | ASP | 1.191 | Plastic | 1.544 | 55.9 | 1.24 |
| 7 | | −0.713 | ASP | 0.200 | | | | |
| 8 | Lens 4 | −0.382 | ASP | 0.350 | Plastic | 1.640 | 23.3 | −2.72 |
| 9 | | −0.664 | ASP | 0.300 | | | | |
| 10 | IR-cut filter | Plano | | 0.300 | Glass | 1.517 | 64.2 | — |
| 11 | | Plano | | 0.300 | | | | |
| 12 | Cover glass | Plano | | 0.800 | Glass | 1.517 | 64.2 | — |
| 13 | | Plano | | 0.982 | | | | |
| 14 | Image | Plano | | — | | | | |

Note:
Reference wavelength (d-line) is 587.6 nm.

TABLE 6

Aspheric Coefficients

| | Surface # | | | |
|---|---|---|---|---|
| | 1 | 2 | 3 | 4 |
| k = | −5.0000E+01 | −6.2198E−01 | 3.5540E+00 | −9.2045E+00 |
| A4 = | −2.5440E−04 | −2.8709E−03 | 1.7069E−02 | 1.9339E−02 |
| A6 = | 3.9346E−06 | 3.6891E−03 | −7.9787E−03 | 4.9563E−03 |
| A8 = | 4.4108E−07 | −4.6220E−04 | 3.1570E−03 | −1.1436E−03 |
| A10 = | 1.4086E−09 | 3.1318E−05 | −7.5680E−04 | 6.2147E−05 |
| A12 = | — | — | 7.2629E−05 | 1.0318E−05 |

| | Surface # | | | |
|---|---|---|---|---|
| | 6 | 7 | 8 | 9 |
| k = | −1.0000E+00 | −1.4764E+00 | −1.9147E+00 | −2.9088E+00 |
| A4 = | −4.5153E−02 | 1.6183E−01 | −3.2682E−01 | −1.3886E−01 |
| A6 = | 2.7138E−02 | −7.5085E−01 | 5.2483E−01 | 2.7283E−01 |
| A8 = | −8.6859E−02 | 6.6108E−01 | −1.5241E+00 | −2.7466E−01 |
| A10 = | −1.0626E−01 | −2.1608E−01 | 2.9734E+00 | 1.9094E−01 |
| A12 = | — | — | −3.2252E+00 | −7.7464E−02 |
| A14 = | — | — | 1.9936E+00 | 1.7866E−02 |
| A16 = | — | — | −5.2673E−01 | −1.7491E−03 |

In the wide-angle image capturing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f [mm] | 1.61 | (R7 − R8)/(R7 + R8) | −0.27 |
| Fno | 2.84 | |f/f2| | 0.21 |
| HFOV [deg.] | 75.0 | f/f3 | 1.30 |
| (V2 + V4)/V3 | 0.83 | f3/f4 | −0.46 |
| T12/f | 1.38 | f/ffs | 0.03 |
| T34/f | 0.12 | frs/ffs | 0.05 |
| R7/R6 | 0.54 | FOV [deg] | 150.0 |
| (R5 + R6)/(R5 − R6) | 0.76 | | |

4th Embodiment

Figure 7:
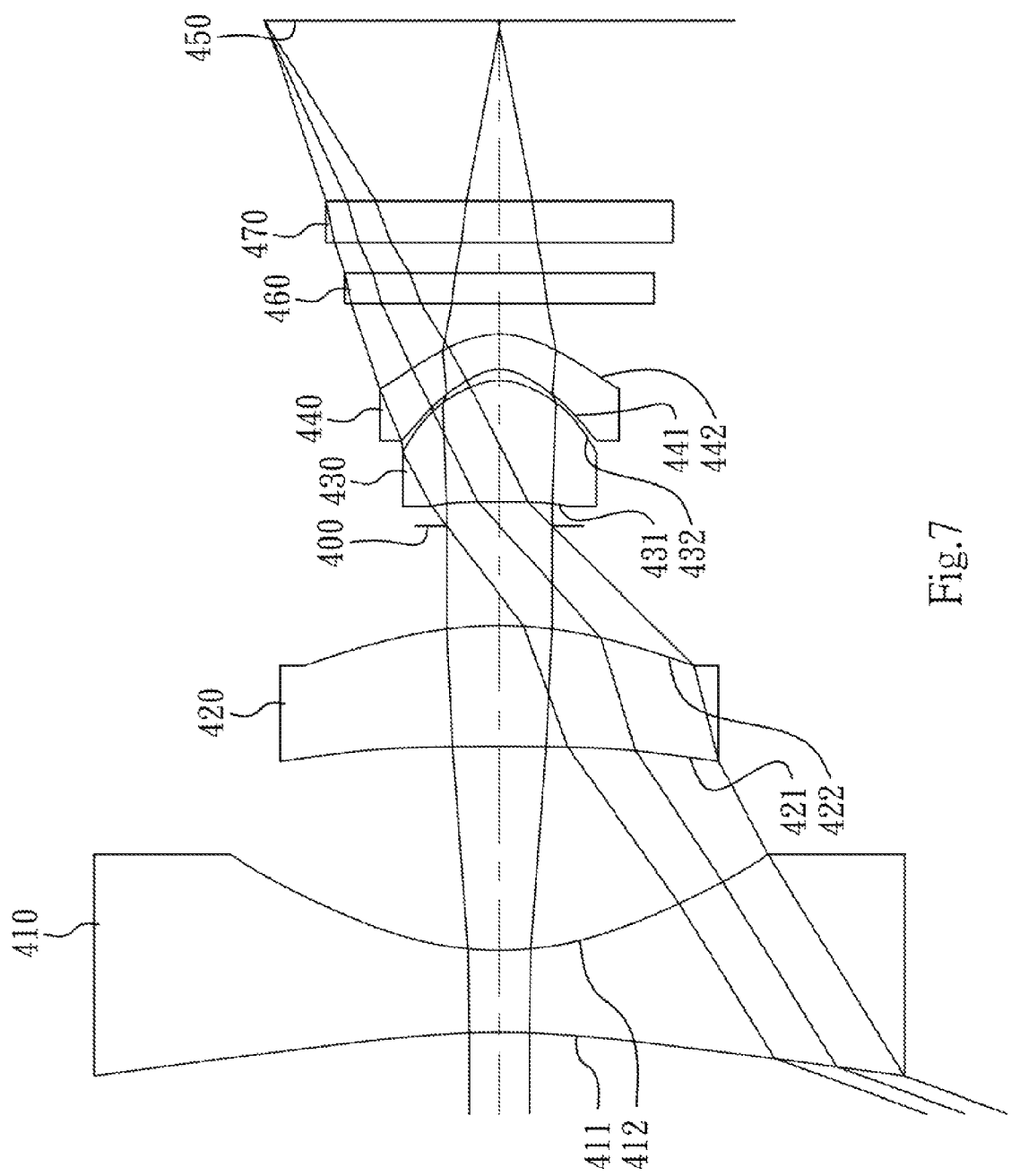
FIG. 7 is a schematic view of a wide-angle image capturing lens assembly according to the 4th embodiment of the present disclosure.
Figure 8:
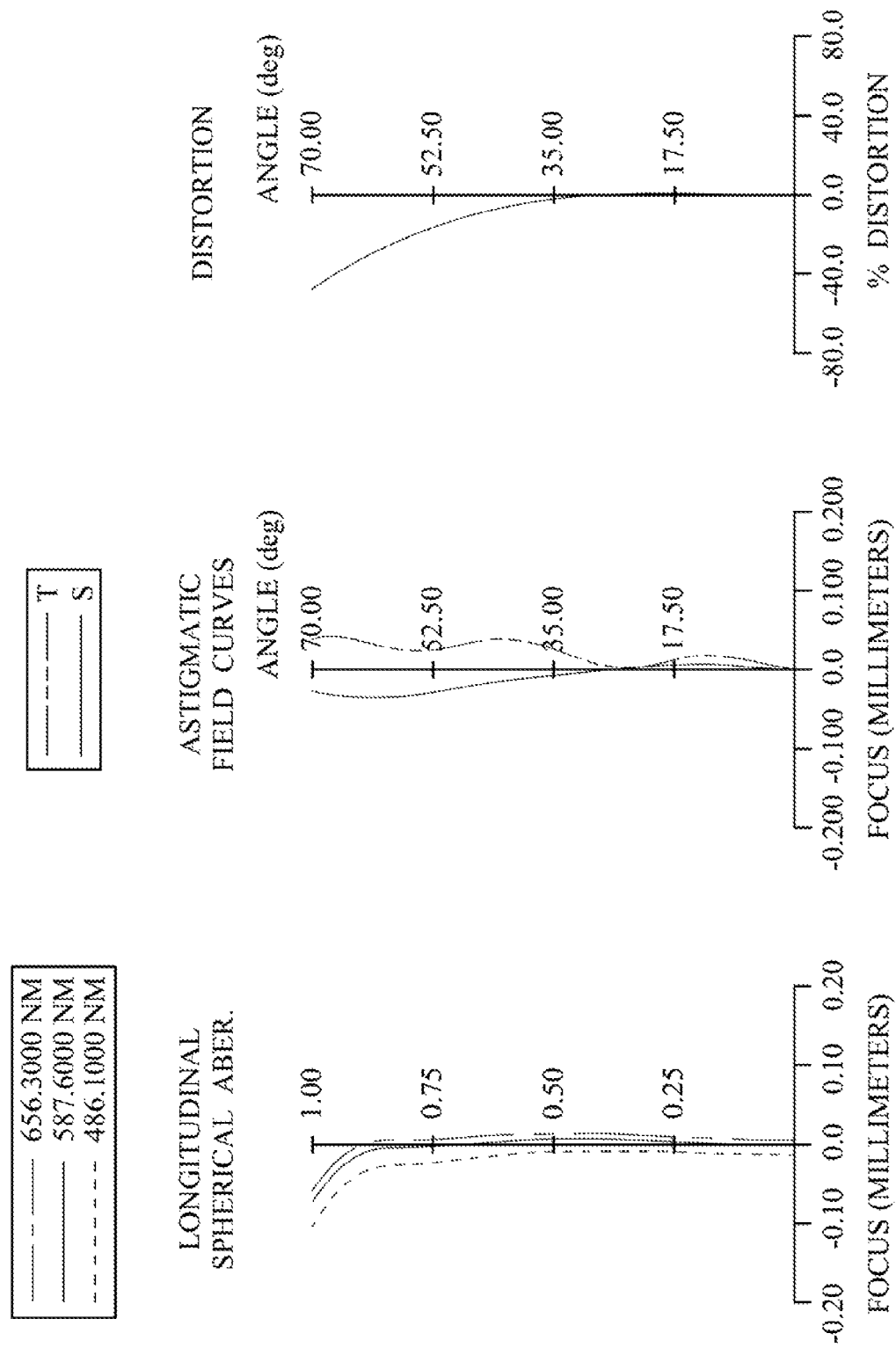
FIG. 8 shows spherical aberration curves, astigmatic field curves and a distortion curve of the wide-angle image capturing lens assembly according to the 4th embodiment.

FIG. 7 is a schematic view of a wide-angle image capturing lens assembly according to the 4th embodiment of the present disclosure. FIG. 8 shows spherical aberration curves, astigmatic field curves and a distortion curve of the wide-angle image capturing lens assembly according to the 4th embodiment. In FIG. 7, the wide-angle image capturing lens assembly includes, in order from an object side to an image side, a first lens element 410, a second lens element 420, an aperture stop 400, a third lens element 430, a fourth lens element 440, an IR-cut filter 460, a cover glass 470 and an image plane 450.

The first lens element 410 with negative refractive power has a concave object-side surface 411 and a concave image-side surface 412. The first lens element 410 is made of glass material and has the object-side surface 411 and the image-side surface 412 being both aspheric.

The second lens element 420 with positive refractive power has a concave object-side surface 421 and a convex image-side surface 422. The second lens element 420 is made of plastic material and has the object-side surface 421 and the image-side surface 422 being both aspheric.

The third lens element 430 with positive refractive power has a concave object-side surface 431 and a convex image-side surface 432. The third lens element 430 is made of plastic material and has the object-side surface 431 and the image-side surface 432 being both aspheric.

The fourth lens element 440 with negative refractive power has a concave object-side surface 441 and a convex image-side surface 442. The fourth lens element 440 is made of plastic material and has the object-side surface 441 and the image-side surface 442 being both aspheric.

Each of the first through fourth lens elements (410-440) is a single and non-cemented lens element with refractive power. The IR-cut filter 460 and the cover glass 470 are made of glass materials which are in order located between the fourth lens element 440 and the image plane 450, and will not affect a focal length of the wide-angle image capturing lens assembly.

The detailed optical data of the 4th embodiment are shown in Table 7 and the aspheric surface data are shown in Table 8 below.

TABLE 7

4th Embodiment
f = 1.60 mm, Fno = 2.70, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.480 | ASP | 0.800 | Glass | 1.542 | 62.9 | −3.88 |
| 2 | | 3.044 | ASP | 2.002 | | | | |
| 3 | Lens 2 | −97.671 | ASP | 1.186 | Plastic | 1.639 | 23.5 | 6.30 |
| 4 | | −3.887 | ASP | 0.977 | | | | |
| 5 | Ape. Stop | Plano | | 0.235 | | | | |
| 6 | Lens 3 | −13.752 | ASP | 1.189 | Plastic | 1.544 | 55.9 | 1.10 |
| 7 | | −0.589 | ASP | 0.104 | | | | |
| 8 | Lens 4 | −0.424 | ASP | 0.350 | Plastic | 1.640 | 23.3 | −2.36 |
| 9 | | −0.780 | ASP | 0.300 | | | | |
| 10 | IR-cut filter | Plano | | 0.300 | Glass | 1.517 | 64.2 | — |
| 11 | | Plano | | 0.300 | | | | |
| 12 | Cover glass | Plano | | 0.400 | Glass | 1.517 | 64.2 | — |
| 13 | | Plano | | 1.774 | | | | |
| 14 | Image | Plano | | — | | | | |

Note:
Reference wavelength (d-line) is 587.6 nm.

TABLE 8

Aspheric Coefficients

| | Surface # | | | |
|---|---|---|---|---|
| | 1 | 2 | 3 | 4 |
| k = | −5.0000E+01 | 1.5657E−02 | 5.0000E+01 | −4.1324E+00 |
| A4 = | 4.2796E−06 | −8.5954E−03 | −1.3322E−02 | 4.1672E−03 |
| A6 = | — | −6.1014E−04 | 1.6791E−03 | −3.5170E−03 |
| A8 = | — | 1.5342E−05 | — | 1.2028E−03 |
| A10 = | — | — | — | −1.7725E−04 |
| A12 = | — | — | — | 1.0318E−05 |

| | Surface # | | | |
|---|---|---|---|---|
| | 6 | 7 | 8 | 9 |
| k = | −1.0000E+00 | −2.2054E+00 | −2.2564E+00 | −3.6171E+00 |
| A4 = | −8.5790E−02 | 1.5858E−01 | −2.8536E−02 | −1.2541E−01 |
| A6 = | 2.8649E−01 | −8.0174E−01 | 8.5290E−02 | 2.0103E−01 |
| A8 = | −1.9262E+00 | 3.5116E−01 | −1.5257E−01 | −2.6410E−01 |
| A10 = | 2.3136E+00 | 3.6891E−02 | 2.9914E+00 | 2.2305E−01 |
| A12 = | — | — | −3.1372E+00 | −8.2617E−02 |

TABLE 8-continued

Aspheric Coefficients

| A14 = | — | — | 2.2882E+00 | 6.1130E−05 |
| A16 = | — | — | −7.9551E−01 | 5.3773E−03 |

In the wide-angle image capturing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f [mm] | 1.60 | (R7 − R8)/(R7 + R8) | −0.30 |
| Fno | 2.70 | |f/f2| | 0.25 |
| HFOV [deg.] | 70.0 | f/f3 | 1.46 |
| (V2 + V4)V3 | 0.84 | f3/f4 | −0.47 |
| T12/f | 1.25 | f/ffs | 0.03 |
| T34/f | 0.07 | frs/ffs | 0.06 |
| R7/R6 | 0.72 | FOV [deg.] | 140.0 |
| (R5 + R6)/(R5 − R6) | 1.09 | | |

5th Embodiment

Figure 9:
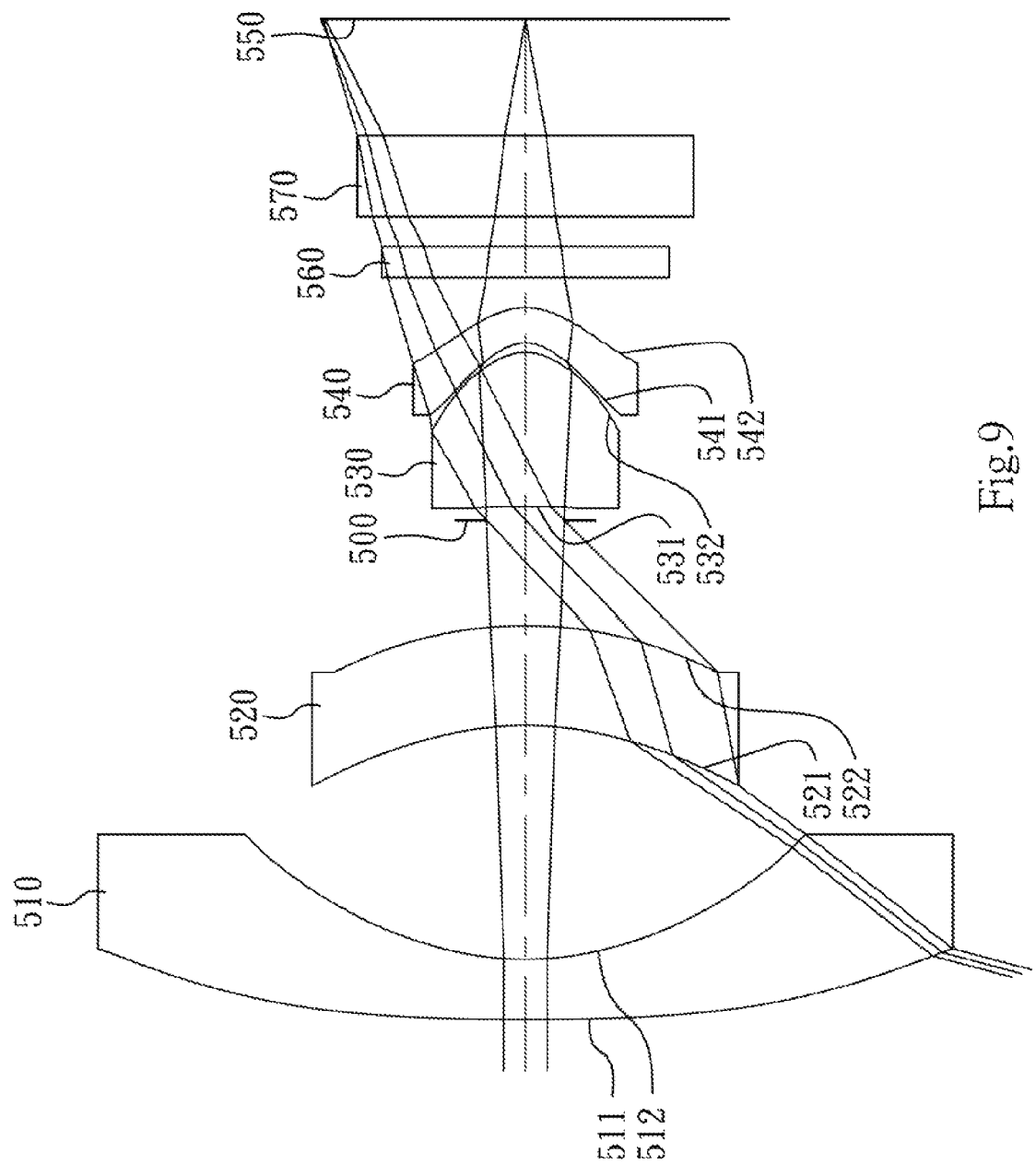
FIG. 9 is a schematic view of a wide-angle image capturing lens assembly according to the 5th embodiment of the present disclosure.
Figure 10:
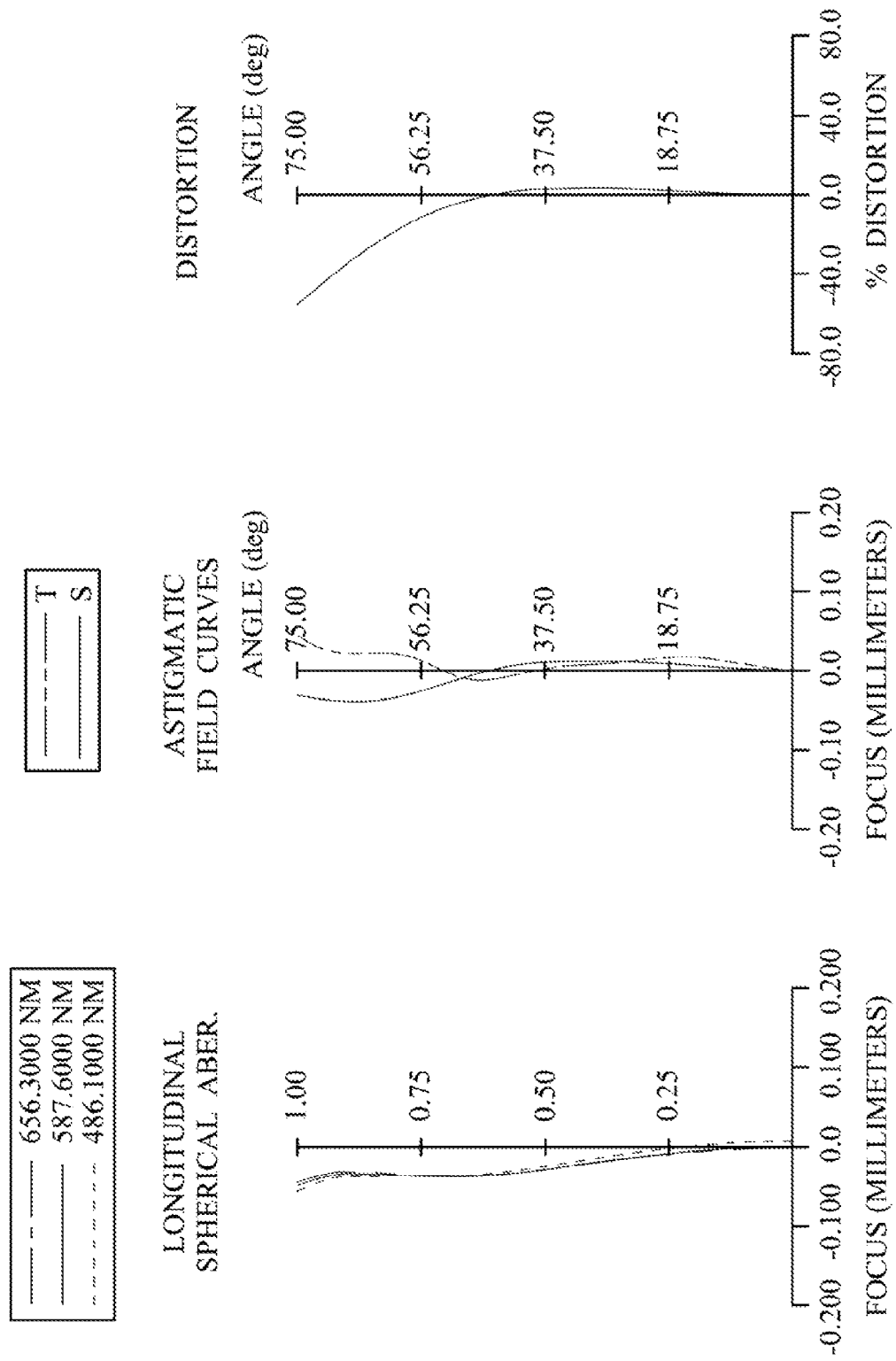
FIG. 10 shows spherical aberration curves, astigmatic field curves and a distortion curve of the wide-angle image capturing lens assembly according to the 5th embodiment.

FIG. 9 is a schematic view of a wide-angle image capturing lens assembly according to the 5th embodiment of the present disclosure. FIG. 10 shows spherical aberration curves, astigmatic field curves and a distortion curve of the wide-angle image capturing lens assembly according to the 5th embodiment. In FIG. 9, the wide-angle image capturing lens assembly includes, in order from an object side to an image side, a first lens element 510, a second lens element 520, an aperture stop 500, a third lens element 530, a fourth lens element 540, an IR-cut filter 560, a cover glass 570 and an image plane 550.

The first lens element 510 with negative refractive power has a convex object-side surface 511 and a concave image-side surface 512. The first lens element 510 is made of glass material and has the object-side surface 511 and the image-side surface 512 being both aspheric.

The second lens element 520 with negative refractive power has a concave object-side surface 521 and a convex image-side surface 522. The second lens element 520 is made of plastic material and has the object-side surface 521 and the image-side surface 522 being both aspheric.

The third lens element 530 with positive refractive power has a concave object-side surface 531 and a convex image-side surface 532. The third lens element 530 is made of plastic material and has the object-side surface 531 and the image-side surface 532 being both aspheric.

The fourth lens element 540 with negative refractive power has a concave object-side surface 541 and a convex image-side surface 542. The fourth lens element 540 is made of plastic material and has the object-side surface 541 and the image-side surface 542 being both aspheric.

Each of the first through fourth lens elements (510-540) is a single and non-cemented lens element with refractive power. The IR-cut filter 560 and the cover glass 570 are made of glass materials which are in order located between the fourth lens element 540 and the image plane 550, and will not affect a focal length of the wide-angle image capturing lens assembly.

The detailed optical data of the 5th embodiment are shown in Table 9 and the aspheric surface data are shown in Table 10 below.

TABLE 9

5th Embodiment
f = 1.22 mm, Fno = 2.84, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 30.057 | ASP | 0.600 | Glass | 1.542 | 62.9 | −6.27 |
| 2 | | 3.036 | ASP | 2.309 | | | | |
| 3 | Lens 2 | −3.332 | ASP | 0.991 | Plastic | 1.640 | 23.3 | −40.82 |
| 4 | | −4.263 | ASP | 1.045 | | | | |
| 5 | Ape. Stop | Plano | | 0.136 | | | | |
| 6 | Lens 3 | −100.000 | ASP | 1.519 | Plastic | 1.544 | 55.9 | 0.87 |
| 7 | | −0.473 | ASP | 0.098 | | | | |
| 8 | Lens 4 | −0.345 | ASP | 0.350 | Plastic | 1.640 | 23.3 | −2.10 |
| 9 | | −0.649 | ASP | 0.300 | | | | |
| 10 | IR-cut filter | Plano | | 0.300 | Glass | 1.517 | 64.2 | — |
| 11 | | Plano | | 0.300 | | | | |
| 12 | Cover glass | Plano | | 0.800 | Glass | 1.517 | 64.2 | — |
| 13 | | Plano | | 1.160 | | | | |
| 14 | Image | Plano | | — | | | | |

Note:
Reference wavelength (d-line) is 587.6 nm.

TABLE 10

Aspheric Coefficients

| Surface # | 1 | 2 | 3 | 4 |
|---|---|---|---|---|
| k = | 2.6313E+01 | −1.0647E−01 | 1.0637E+00 | −6.8784E+00 |
| A4 = | 1.9626E−03 | −1.1069E−02 | 1.9360E−02 | −1.5574E−02 |
| A6 = | −2.9898E−05 | 1.2225E−03 | −5.0028E−03 | 3.8681E−03 |
| A8 = | −9.9801E−07 | −1.2087E−04 | 2.4656E−03 | −1.1340E−03 |
| A10 = | — | 3.1014E−06 | −6.4289E−04 | 1.1689E−04 |
| A12 = | — | — | 7.2629E−05 | 1.0318E−05 |

| Surface # | 6 | 7 | 8 | 9 |
|---|---|---|---|---|
| k = | −1.0000E+00 | −1.7439E+00 | −1.6798E+00 | −2.1721E+00 |
| A4 = | −1.3652E−01 | 1.4043E−01 | 1.0359E−01 | −6.7087E−02 |
| A6 = | 2.5762E−01 | −7.1719E−01 | 1.1458E−01 | 2.2324E−01 |
| A8 = | −8.8606E+00 | 2.5050E−01 | −1.5703E+00 | −3.0671E−01 |
| A10 = | 2.3705E+01 | 1.0348E−01 | 3.0521E+00 | 2.6591E−01 |
| A12 = | — | — | −2.9217E+00 | −9.3498E−02 |
| A14 = | — | — | 2.0516E+00 | −6.9251E−03 |
| A16 = | — | — | —7.7231E−01 | 9.5849E−03 |

In the wide-angle image capturing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f [mm] | 1.22 | (R7 − R8)/(R7 + R8) | −0.31 |
| Fno | 2.84 | \|f/f2\| | 0.03 |
| HFOV [deg.] | 75.0 | f/f3 | 1.41 |
| (V2 + V4)/V3 | 0.83 | f3/f4 | −0.41 |
| T12/f | 1.89 | f/ffs | −0.22 |
| T34/f | 0.08 | frs/ffs | −0.37 |
| R7/R6 | 0.73 | FOV [deg.] | 150.0 |
| (R5 + R6)/(R5 − R6) | 1.01 | | |

6th Embodiment

Figure 11:
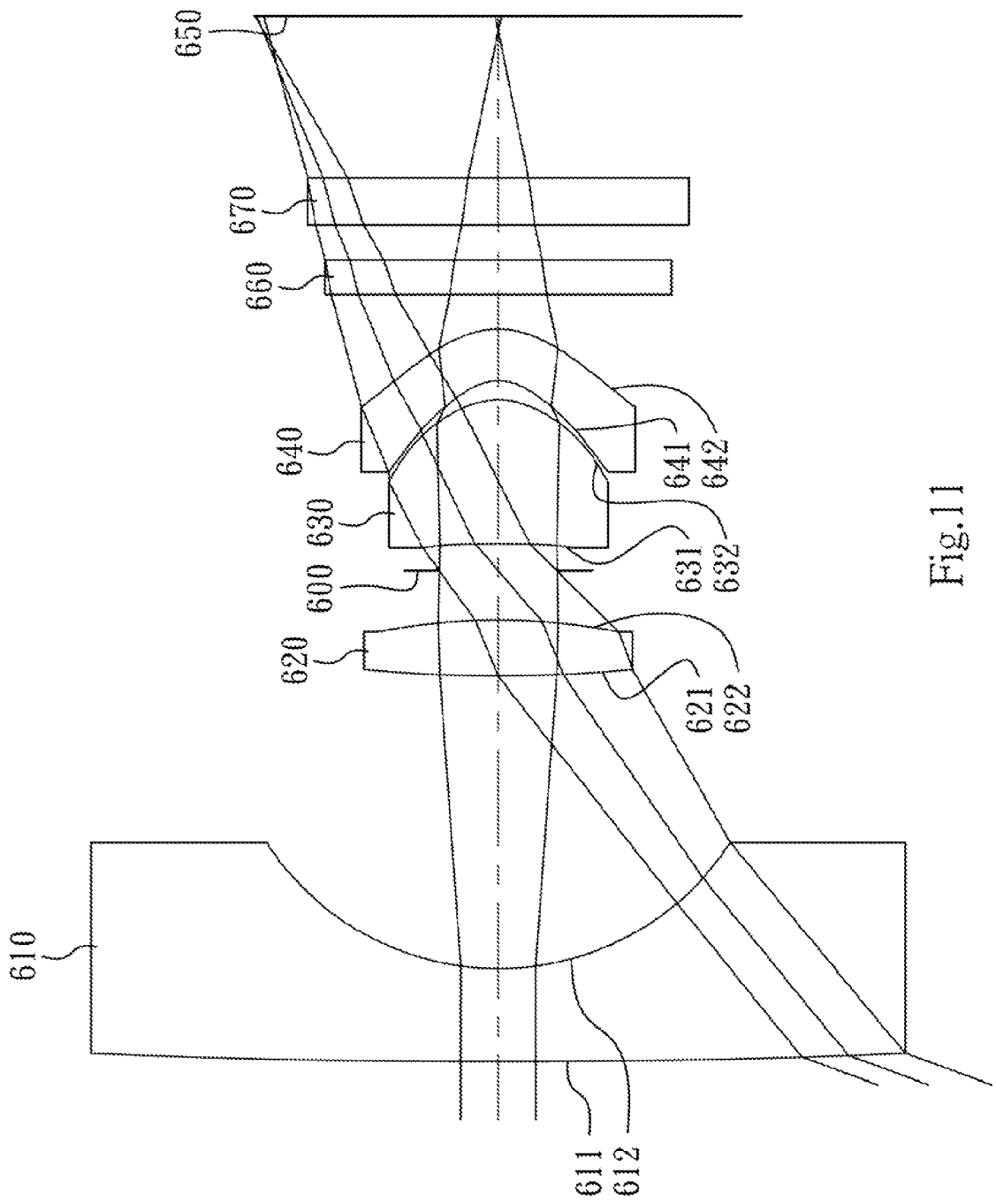
FIG. 11 is a schematic view of a wide-angle image capturing lens assembly according to the 6th embodiment of the present disclosure.
Figure 12:
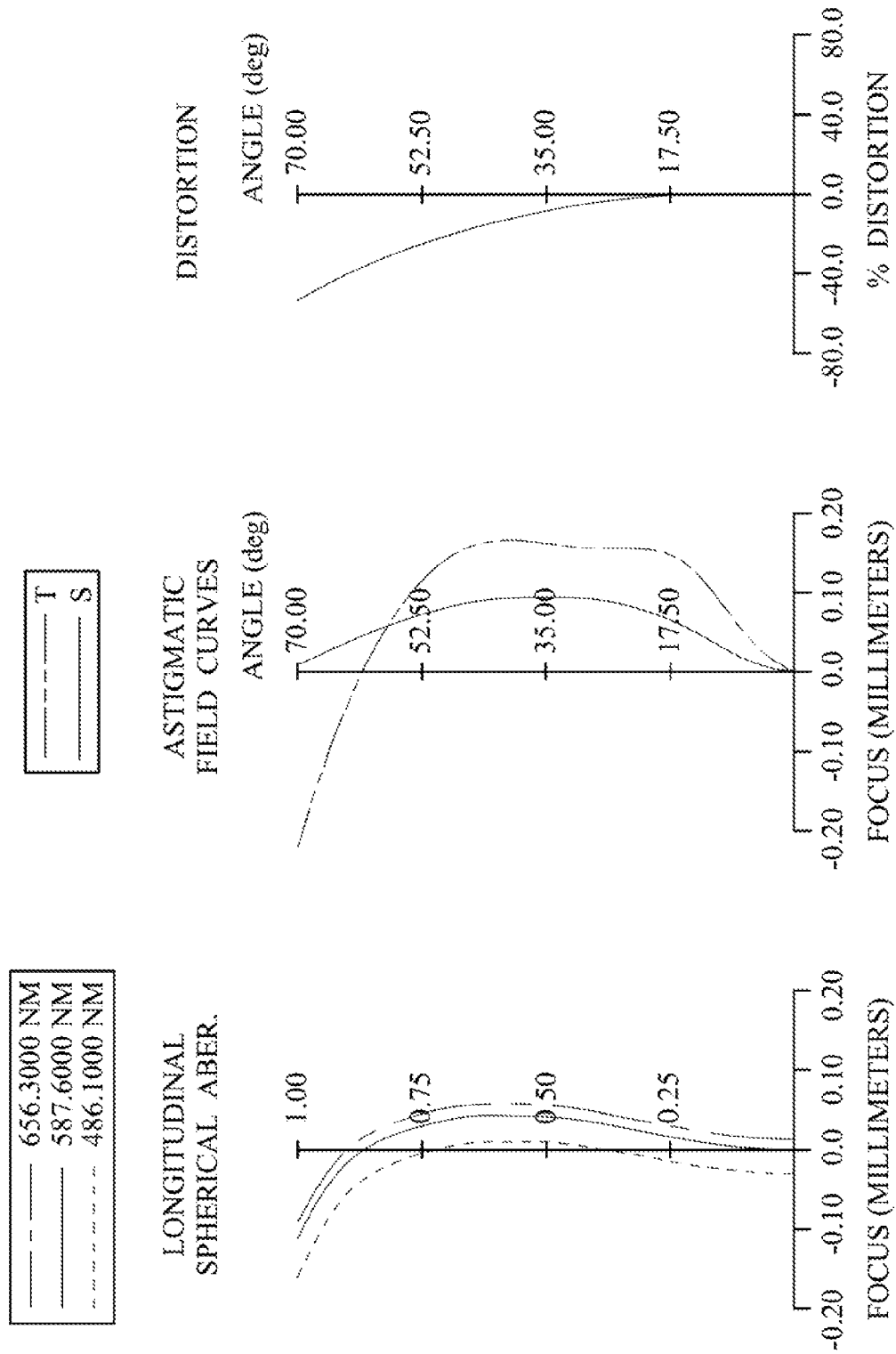
FIG. 12 shows spherical aberration curves, astigmatic field curves and a distortion curve of the wide-angle image capturing lens assembly according to the 6th embodiment.

FIG. 11 is a schematic view of a wide-angle image capturing lens assembly according to the 6th embodiment of the present disclosure. FIG. 12 shows spherical aberration curves, astigmatic field curves and a distortion curve of the wide-angle image capturing lens assembly according to the 6th embodiment. In FIG. 11, the wide-angle image capturing lens assembly includes, in order from an object side to an image side, a first lens element 610, a second lens element 620, an aperture stop 600, a third lens element 630, a fourth lens element 640, an IR-cut filter 660, a cover glass 670 and an image plane 650.

The first lens element 610 with negative refractive power has a convex object-side surface 611 and a concave image-side surface 612. The first lens element 610 is made of plastic material and has the object-side surface 611 being aspheric.

The second lens element 620 with positive refractive power has a convex object-side surface 621 and a convex image-side surface 622. The second lens element 620 is made of plastic material and has the image-side surface 622 being aspheric.

The third lens element 630 with positive refractive power has a concave object-side surface 631 and a convex image-side surface 632. The third lens element 630 is made of plastic material and has the object-side surface 631 and the image-side surface 632 being both aspheric.

The fourth lens element 640 with negative refractive power has a concave object-side surface 641 and a convex image-side surface 642. The fourth lens element 640 is made of plastic material and has the object-side surface 641 and the image-side surface 642 being both aspheric.

Each of the first through fourth lens elements (610-640) is a single and non-cemented lens element with refractive power. The IR-cut filter 660 and the cover glass 670 are made of glass materials which are in order located between the fourth lens element 640 and the image plane 650, and will not affect a focal length of the wide-angle image capturing lens assembly.

The detailed optical data of the 6th embodiment are shown in Table 11 and the aspheric surface data are shown in Table 12 below.

TABLE 11

6th Embodiment
f = 1.61 mm, Fno = 2.50, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 100.000 | ASP | 0.800 | Plastic | 1.535 | 55.7 | −4.55 |
| 2 | | 2.370 | | 2.518 | | | | |
| 3 | Lens 2 | 12.409 | | 0.486 | Plastic | 1.639 | 23.5 | 5.52 |
| 4 | | −4.858 | ASP | 0.419 | | | | |
| 5 | Ape. Stop | Plano | | 0.232 | | | | |
| 6 | Lens 3 | −13.752 | ASP | 1.244 | Plastic | 1.544 | 55.9 | 1.12 |
| 7 | | −0.600 | ASP | 0.163 | | | | |
| 8 | Lens 4 | −0.388 | ASP | 0.440 | Plastic | 1.640 | 23.3 | −2.96 |
| 9 | | −0.705 | ASP | 0.300 | | | | |
| 10 | IR-cut filter | Plano | | 0.300 | Glass | 1.517 | 64.2 | — |
| 11 | | Plano | | 0.300 | | | | |
| 12 | Cover glass | Plano | | 0.400 | Glass | 1.517 | 64.2 | — |

TABLE 11-continued

6th Embodiment
f = 1.61 mm, Fno = 2.50, HFOV = 70.0 deg.

| Surface # | Curvature Radius | Thickness | Material | Index | Abbe # | Focal Length |
|---|---|---|---|---|---|---|
| 13 | Plano | 1.399 | | | | |
| 14 Image | Plano | — | | | | |

Note:
Reference wavelength (d-line) is 587.6 nm.

TABLE 12

Aspheric Coefficients

| | Surface # | | |
|---|---|---|---|
| | 1 | 4 | 6 |
| k = | −5.0000E+01 | −4.5491E+00 | −1.0000E+00 |
| A4 = | 7.3789E−05 | 5.4261E−03 | −1.1514E−01 |
| A6 = | — | −3.2241E−03 | 4.3795E−01 |
| A8 = | — | 1.2151E−03 | −2.1725E+00 |
| A10 = | — | −1.8961E−04 | 2.5705E+00 |
| A12 = | — | 1.0318E−05 | |

| | Surface # | | |
|---|---|---|---|
| | 7 | 8 | 9 |
| k = | −1.2203E+00 | −1.7325E+00 | −2.4138E+00 |
| A4 = | 4.7481E−01 | −2.2055E−02 | −1.3447E−01 |
| A6 = | −9.8833E−01 | 9.2008E−02 | 1.9980E−01 |
| A8 = | 4.1302E−01 | −1.5219E+00 | −2.6278E−01 |
| A10 = | 2.3294E−02 | 2.9945E+00 | 2.2444E−01 |
| A12 = | — | −3.1336E+00 | −8.1933E−02 |
| A14 = | — | 2.2922E+00 | 2.9696E−04 |
| A16 = | — | −7.9520E−01 | 5.2645E−03 |

In the wide-angle image capturing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| f [mm] | 1.61 | (R7 − R8)(R7 + R8) | −0.29 |
|---|---|---|---|
| Fno | 2.50 | \|f/f2\| | 0.29 |
| HFOV [deg.] | 70.0 | f/f3 | 1.45 |
| (V2 + V4)/V3 | 0.84 | f3/f4 | −0.38 |
| T12/f | 1.56 | f/ffs | 0.11 |
| T34/f | 0.10 | frs/ffs | 0.18 |
| R7/R6 | 0.65 | FOV [deg.] | 140.0 |
| (R5 + R6)/(R5 − R6) | 1.09 | | |

It is to be noted that TABLES 1-12 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. A wide-angle image capturing lens assembly comprising four lens elements with refractive power, in order from an object side to an image side:
a first lens element with negative refractive power having a concave image-side surface;
a second lens element with refractive power having a concave object-side surface and a convex image-side surface;
a third lens element with positive refractive power having a convex image-side surface; and
a fourth lens element with negative refractive power having a concave object-side surface and a convex image-side surface, wherein both of the object-side surface and the image-side surface of the fourth lens element are aspheric;
wherein each of the first through fourth lens elements is a single and non-cemented lens element with refractive power, a curvature radius of an object-side surface of the third lens element is R5, a curvature radius of the image-side surface of the third lens element is R6, a curvature radius of the object-side surface of the fourth lens element is R7, a maximal field of view of the wide-angle image capturing lens assembly is FOV, and the following relationships are satisfied:

$0.6<(R5+R6)/(R5-R6)<2.0;$ $0.30<R7/R6<0.74;$ and 120 degrees $<FOV<200$ degrees.

2. A wide-angle image capturing lens assembly comprising, four lens elements with refractive power, in order from an object side to an image side:
a first lens element with negative refractive power having a concave image-side surface;
a second lens element with refractive power having a convex image-side surface;
a third lens element with positive refractive power having a convex image-side surface; and
a fourth lens element with negative refractive pourer having a concave object-side surface and a convex image-side surface, wherein both of the object-side surface and the image-side surface of the fourth lens element are aspheric;
wherein each of the first through fourth lens elements is a single and non-cemented lens element with refractive power, a curvature radius of an object-side surface of the third lens element is R5, a curvature radius of the image-side surface of the third lens element is R6, a curvature radius of the object-side surface of the fourth lens element is R7, an axial distance between the first lens element and the second lens element is T12, a focal length of the wide-angle image capturing lens assembly is f, an Abbe number of the second lens element is V2, an Abbe number of the third lens element is V3, an Abbe number of the fourth lens element is V4, and the following relationships are satisfied:

$0.6<(R5+R6)/(R5-R6)<2.0;$ $0.30<R7/R6<0.90;$ $0.80<T12/f<2.5;$ and $0.7<(V2+V4)/V3<1.2.$ 3. The wide-angle image capturing lens assembly of claim 1, further comprising:
a stop located between the second lens element and the third lens element.

4. The wide-angle age capturing lens assembly of claim 1, wherein a focal length of the wide-angle image capturing lens assembly is f, a focal length of the second lens element is f2, and the following relationship is satisfied:

$|f/f2|<0.40$.

5. The wide-angle image capturing lens assembly of claim 1, wherein the second lens element has positive refractive power and at least one of the object-side surface and the image-side surface of the second lens element is aspheric.

6. The wide-angle image capturing lens assembly of claim 1, further comprising a stop, wherein a composite focal length of the lens elements with refractive power disposed between an object and the stop is ffs, a composite focal length of the lens elements with refractive power disposed between the stop and an image plane is frs, and the following relationship is satisfied:

$0<frs/ffs<0.25$.

7. The wide-angle image capturing lens assembly of claim 2, wherein the curvature radius of the object-side surface of the fourth lens element is R7, a curvature radius of the image-side surface of the fourth lens element is R8, and the following relationship is satisfied:

$-0.50<(R7-R8)/(R7+R8)<-0.10$.

8. The wide-angle image capturing lens assembly of claim 2, wherein the curvature radius of the image-side surface of the third lens element is R6, the curvature radius of the object-side surface of the fourth lens element is R7, and the following relationship is satisfied:

$0.30<R7/R6<0.74$.

9. The wide-angle image capturing lens assembly of claim 2, wherein the focal length of the wide-angle image capturing lens assembly is f, a focal length of the second lens element is f2, and the following relationship is satisfied:

$|f/f2|<0.40$.

10. The wide-angle image capturing lens assembly of claim 2, further comprising a stop, wherein a composite focal length of the lens elements with refractive power disposed between an object and the stop is ffs, the focal length of the wide-angle image capturing lens assembly is f, and the following relationship is satisfied.

$0<f/ffs$.

11. The wide-angle image capturing lens assembly of claim 3, wherein an axial distance between the first lens element and the second lens element is T12, a focal length of the wide-angle image capturing lens assembly is f, and the following relationship is satisfied:

$0.80<T12/f<2.5$.

12. The wide-angle image capturing lens assembly of claim 4, wherein the curvature radius of the object-side surface of the third lens element is R5, the curvature radius of the image-side surface of the third lens element is R6, and the folio wring relationship is satisfied:

$0.8<(R5+R6)/(R5-R6)<1.5$.

13. The wide-angle image capturing lens assembly of claim 4, wherein an Abbe number of the second lens element is V2, an Abbe number of the third lens element is V3, an Abbe number of the fourth lens element is V4, and the following relationship is satisfied:

$0.7<(V2+V4)/V3<1.2$.

14. The wide-angle image capturing lens assembly of claim 5, wherein the curvature radius of the object-side surface of the fourth lens element is R7, a curvature radius of the image-side surface of the fourth lens element is R8, and the following relationship is satisfied:

$-0.40<(R7-R8)/(R7+R8)<-0.20$.

15. The wide-angle image capturing lens assembly of claim 5, wherein the first lens element has a convex object-side surface.

16. The wide-angle image capturing lens assembly of claim 7, wherein an axial distance between the third lens element and the fourth lens element is T34, the focal length of the wide-angle image capturing lens assembly is f, and the following relationship is satisfied:

$0.05<T34/f<0.20$.

17. The wide-angle image capturing lens assembly of claim 10, wherein the first lens element has a convex object-id surface.

18. The wide-angle image capturing lens assembly of claim 10, wherein the axial distance between the first lens element and the second lens element is T12 the focal length of the wide-angle image capturing lens assembly is f, and the following relationship is satisfied:

$1.2<T12/f<2.0$.

19. The wide-angle image capturing lens assembly of claim 11, wherein the curvature radius of the object-side surface of the third lens element is R5, the curvature radius of the image-side surface of the third lens element is R6, and the following relationship is satisfied:

$0.85<(R5+R6)/(R5-R6)<1.3$.

20. The wide-angle image capturing lens assembly of claim 11, wherein the focal length of the wide-angle image capturing lens assembly is f, a focal length of the third lens element is f3, and the following relationship is satisfied:

$0.9<f/f3<1.7$.

21. The wide-angle image capturing lens assembly of claim 15, wherein a focal length of the third lens element is f3, a focal length of the fourth lens element is f4, and the following relationship is satisfied:

$-0.6<f3/f4<-0.3$.

* * * * *

UNITED STATES PATENT AND TRADEMARK OFFICE
CERTIFICATE OF CORRECTION

PATENT NO.         : 8,982,479 B2
APPLICATION NO.    : 13/792178
DATED              : March 17, 2015
INVENTOR(S)        : Hsieh et al.

It is certified that error appears in the above-identified patent and that said Letters Patent is hereby corrected as shown below:

In the Claims

Column 20, line 37, Claim 2 delete "a fourth lens element with negative refractive pourer", and insert --a fourth lens element with negative refractive power--.

Column 22, line 2, Claim 12 delete "and the folio wring relationship is satisfied", and insert --and the following relationship is satisfied--.

Column 22, line 30, Claim 17 delete "the first lens element has a convex object-id surface", and insert --the first lens element has a convex object-side surface--.

Column 22, line 33, Claim 18 delete "...second lens element is T12 the focal length...", and insert --...second lens element is T12, the focal length...--.

Signed and Sealed this
Thirtieth Day of June, 2015

Michelle K. Lee
*Director of the United States Patent and Trademark Office*